US010416986B2

(12) United States Patent
Mukhopadhyay et al.

(10) Patent No.: US 10,416,986 B2
(45) Date of Patent: Sep. 17, 2019

(54) AUTOMATING APPLICATION UPDATES IN A VIRTUAL COMPUTING ENVIRONMENT

(71) Applicant: VMware, Inc., Palo Alto, CA (US)

(72) Inventors: Sudipto Mukhopadhyay, Pleasanton, CA (US); Muhammad Akbar, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/655,205

(22) Filed: Jul. 20, 2017

(65) Prior Publication Data

US 2019/0026095 A1 Jan. 24, 2019

(51) Int. Cl.
- *G06F 8/65* (2018.01)
- *G06F 21/44* (2013.01)
- *G06F 21/10* (2013.01)
- *G06F 8/61* (2018.01)
- *G06F 21/57* (2013.01)

(52) U.S. Cl.
CPC .................. *G06F 8/65* (2013.01); *G06F 8/63* (2013.01); *G06F 21/105* (2013.01); *G06F 21/44* (2013.01); *G06F 21/57* (2013.01)

(58) Field of Classification Search
CPC ..... G06F 8/60; G06F 8/61; G06F 8/62; G06F 8/63; G06F 8/64; G06F 8/65; G06F 8/654; G06F 8/656; G06F 8/658; G06F 8/66; G06F 21/10; G06F 21/105; G06F 21/12; G06F 21/121; G06F 21/30; G06F 21/31; G06F 21/33; G06F 21/44; G06F 21/45

USPC .................................................. 717/168–178
See application file for complete search history.

(56) References Cited

U.S. PATENT DOCUMENTS

| | | | | |
|---|---|---|---|---|
| 6,370,249 B1* | 4/2002 | Van Oorschot | ......... | H04L 9/083 380/259 |
| 8,245,579 B2* | 8/2012 | Wilner | ................ | H03K 17/962 73/780 |
| 8,646,070 B1* | 2/2014 | Patsenker | ................ | G06F 8/61 726/22 |
| 8,677,351 B2* | 3/2014 | Le | ............. | G06F 8/63 718/1 |
| 8,775,577 B1* | 7/2014 | Alford | ................... | H04L 67/34 709/221 |
| 9,292,275 B2* | 3/2016 | Bowen | ............... | G06F 9/45558 |
| 9,294,284 B1* | 3/2016 | Mao | ....................... | H04L 9/3247 |
| 9,448,783 B2* | 9/2016 | Le | ............. | G06F 8/63 |
| 9,654,548 B2* | 5/2017 | Arai | ......................... | G06F 8/65 |

(Continued)

OTHER PUBLICATIONS

Ellingwood, Justin, "How to Add and Delete Users on an Ubuntu 14.04 VPS," DigitalOcean, Apr. 22, 2014, last retrieved from https://www.digitalocean.com/community/tutorials/how-to-add-and-delete-users-on-an-ubuntu-14-04-vps on Apr. 30, 2018. (Year: 2014).*

(Continued)

*Primary Examiner* — Andrew M. Lyons (57) ABSTRACT

In a computer-implemented method for automating application updates in a virtual computing environment, an update script and a digital signature for the update script are received, where the update script comprises an application update for updating an application installed on the virtual computing environment. The digital signature of the update script is validated using a public key of the virtual computing environment. Provided the digital signature of the update script is validated, the update script is executed to update the application.

16 Claims, 8 Drawing Sheets

(56) References Cited

U.S. PATENT DOCUMENTS

| | | | |
|---|---|---|---|
| 9,740,870 B1* | 8/2017 | Shepard | G06F 21/60 |
| 9,819,496 B2* | 11/2017 | Lin | H04L 9/3263 |
| 9,881,160 B2* | 1/2018 | Batke | G06F 21/572 |
| 2002/0029170 A1* | 3/2002 | Gasser | G06Q 20/20 |
| | | | 705/26.1 |
| 2002/0174256 A1* | 11/2002 | Bonilla | G06F 9/468 |
| | | | 719/310 |
| 2004/0204949 A1* | 10/2004 | Shaji | G06F 11/1415 |
| | | | 717/174 |
| 2006/0190766 A1* | 8/2006 | Adler | G06F 11/2025 |
| | | | 714/13 |
| 2008/0016357 A1* | 1/2008 | Suarez | H04L 63/0823 |
| | | | 713/176 |
| 2008/0244577 A1* | 10/2008 | Le | G06F 8/63 |
| | | | 718/1 |
| 2009/0210631 A1* | 8/2009 | Bosworth | G06F 12/0875 |
| | | | 711/141 |
| 2009/0217362 A1* | 8/2009 | Nanda | G06F 21/33 |
| | | | 726/5 |
| 2011/0061046 A1* | 3/2011 | Phillips | G06F 9/45533 |
| | | | 717/176 |
| 2011/0264718 A1* | 10/2011 | Chen | G06F 9/45537 |
| | | | 707/831 |
| 2011/0296408 A1* | 12/2011 | Lo | G06F 8/65 |
| | | | 718/1 |
| 2012/0324446 A1* | 12/2012 | Fries | G06F 21/64 |
| | | | 718/1 |
| 2013/0117554 A1* | 5/2013 | Ylonen | H04L 9/08 |
| | | | 713/151 |
| 2013/0152047 A1* | 6/2013 | Moorthi | G06F 11/368 |
| | | | 717/124 |
| 2014/0082620 A1* | 3/2014 | Wagner | G06F 11/3006 |
| | | | 718/1 |
| 2014/0143542 A1* | 5/2014 | Chang | G06F 12/1408 |
| | | | 713/165 |
| 2014/0365765 A1* | 12/2014 | Oswalt | H04L 63/123 |
| | | | 713/156 |
| 2015/0186175 A1* | 7/2015 | Van Der Walt | G06F 3/0481 |
| | | | 718/1 |
| 2015/0222604 A1* | 8/2015 | Ylonen | H04L 63/062 |
| | | | 713/171 |
| 2015/0254451 A1* | 9/2015 | Doane | G06F 21/44 |
| | | | 726/1 |
| 2015/0324587 A1* | 11/2015 | Batke | G06F 21/572 |
| | | | 713/175 |
| 2016/0036858 A1* | 2/2016 | Chieu | H04L 63/20 |
| | | | 726/1 |
| 2016/0203313 A1* | 7/2016 | El-Moussa | G06F 8/65 |
| | | | 726/23 |
| 2016/0239396 A1* | 8/2016 | Deng | G06F 11/2007 |
| 2016/0306977 A1* | 10/2016 | Zarakas | G06F 8/654 |
| 2016/0350093 A1* | 12/2016 | Walker | H04L 9/3247 |
| 2017/0019387 A1* | 1/2017 | Ylonen | H04L 63/062 |
| 2017/0068530 A1* | 3/2017 | Berrange | G06F 8/65 |
| 2017/0220404 A1* | 8/2017 | Polar Seminario | G06F 8/654 |
| 2017/0222981 A1* | 8/2017 | Srivastav | H04L 63/0428 |
| 2017/0351862 A1* | 12/2017 | Mohinder | G06F 21/57 |
| 2018/0088928 A1* | 3/2018 | Smith | H04L 67/34 |

OTHER PUBLICATIONS

LinuxQuestions, "Which is safer? Only ssh +scp for 2 users? or ssh (1 user) + vsftpd (1 virtual user)," Sep. 18, 2011, last retrieved from https://www.linuxquestions.org/questions/linux-security-4/which-is-safer-only-ssh-scp-for-2-users-or-ssh-1-user-vsftpd-1-virtual-user-903695/ (Year: 2011).*

C. M. Hayden, E. K. Smith, E. A. Hardisty, M. Hicks and J. S. Foster, "Evaluating Dynamic Software Update Safety Using Systematic Testing," in IEEE Transactions on Software Engineering, vol. 38, No. 6, pp. 1340-1354, Nov.-Dec. 2012. (Year: 2012).*

* cited by examiner

AUTOMATING APPLICATION UPDATES IN A VIRTUAL COMPUTING ENVIRONMENT

BACKGROUND

In conventional virtual computing environments, creating and managing hosts (e.g., ESX hosts) and virtual machines may be complex and cumbersome. Oftentimes, a user, such as an IT administrator, requires a high level and complex skill set to effectively configure a new host to join the virtual computing environment. Moreover, management of workloads and workload domains, including allocation of hosts and maintaining consistency within hosts of particular workload domains, is often made difficult due to the distributed nature of conventional virtual computing environments. Furthermore, applications executing within the virtual computing environment often require updating to ensure performance and functionality. Management of updates may also be difficult due to the distributed nature of conventional virtual computing environments.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DETAILED DESCRIPTION OF CERTAIN EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "initiating," "receiving," "comparing," "determining," "updating," "discovering," "converting," "identifying," "generating," "applying," or the like, refer to the actions and processes of an electronic computing device or system such as: a host processor, a processor, a memory, a hyper-converged appliance, a software defined network (SDN) manager, a system manager, a virtualization management server or a virtual machine (VM), among others, of a virtualization infrastructure or a computer system of a distributed computing system, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Example embodiments described herein improve the performance of computer systems such as pre-configured hyper-converged computing devices by improving the management and updating of applications. Pre-configured hyper-converged computing devices may not be monitored by an administrator for performing application updates. Moreover, certain types of application updates may require high level security privileges for a user account. Embodiments described herein provide for automating application updates while maintaining security of the virtual computing environment.

Embodiments described herein provide methods for automating application updates in a virtual computing environment. A first script that can execute a second script as a command line parameter is specified, where the first script is for execution by a user account without requiring a password. A public key of a signature authority is installed within a known root folder of the virtual computing environment. An update script and a digital signature for the update script are received, where the update script comprises an application update for updating an application installed on the virtual computing environment. The digital signature of the update script is validated using a public key of the virtual computing environment. Provided the digital signature of the update script is validated, the update script is executed to update the application.

Embodiments of a Virtual Computing Environment

Figure 1:
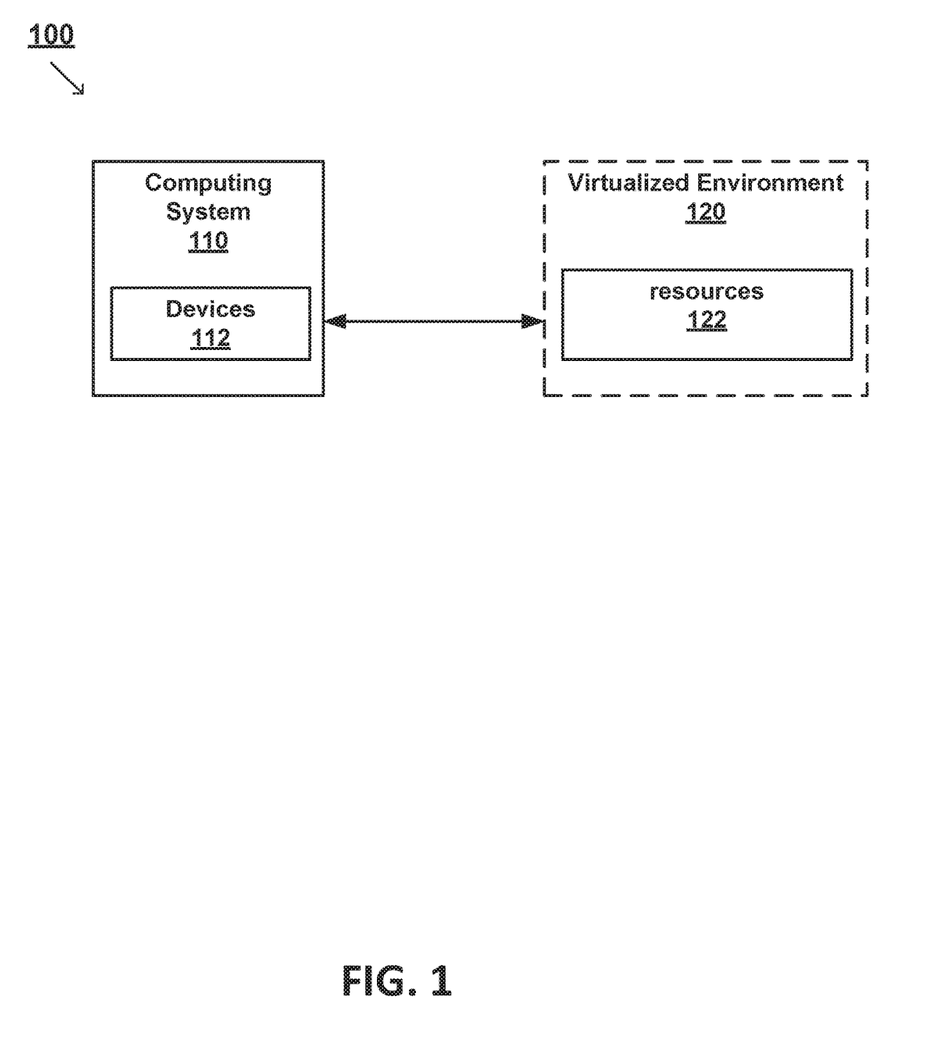
FIG. 1 depicts a block diagram of a virtual computing environment, according to various embodiments.

FIG. 1 depicts a block diagram that illustrates virtual computing environment (VCE) 100 (or virtualization infrastructure) that includes computing system 110 and virtualized environment 120, according to various embodiments. In general, computing system 110 and virtualized environment 120 are communicatively coupled over a network such that computing system 110 may access functionality of virtualized environment 120.

As will be described in further detail below, computing system 110 is implemented using virtualized environment 120. Also, while implementing the business functionality, computing system 110 might use some of resources 122.

In one embodiment, computing system 110 may be a system (e.g., enterprise system) or network that includes a combination of computer hardware and software. The corporation or enterprise utilizes the combination of hardware and software to organize and run its operations. To do this, system 110 uses resources 122 because system 110 typically does not have dedicated resources that can be given to the virtualized environment. For example, an enterprise system may provide various computing resource for various needs such as, but not limited to information technology (IT), security, email, etc.

In various embodiments, computing system 110 includes a plurality of devices 112. The devices are any number of physical and/or virtual machines. For example, in one embodiment, computing system 110 is a corporate computing environment that includes tens of thousands of physical and/or virtual machines. It is understood that a virtual machine is implemented in virtualized environment 120 that includes one or some combination of physical computing machines. Virtualized environment 120 provides resources 122, such as storage, memory, servers, CPUs, network switches, etc., that are the underlying hardware infrastructure for VCE 100.

The physical and/or virtual machines may include a variety of operating systems and applications (e.g., operating system, word processing, etc.). The physical and/or virtual machines may have the same installed applications or may have different installed applications or software. The installed software may be one or more software applications from one or more vendors.

Each virtual machine may include a guest operating system and a guest file system.

Moreover, the virtual machines may be logically grouped. That is, a subset of virtual machines may be grouped together in a container (e.g., VMware vApp™). For example, three different virtual machines may be implemented for a particular workload. As such, the three different virtual machines are logically grouped together to facilitate in supporting the workload. The virtual machines in the logical group may execute instructions alone and/or in combination (e.g., distributed) with one another. Also, the container of virtual machines and/or individual virtual machines may be controlled by a virtual management system. The virtualization infrastructure may also include a plurality of virtual datacenters. In general, a virtual datacenter is an abstract pool of resources (e.g., memory, CPU, storage). It is understood that a virtual data center is implemented on one or some combination of physical machines.

In various embodiments, computing system 110 may be a cloud environment, built upon a virtualized environment 120. Computing system 110 may be located in an Internet connected datacenter or a private cloud computing center coupled with one or more public and/or private networks. Computing system 110, in one embodiment, typically couples with a virtual or physical entity in a computing environment through a network connection which may be a public network connection, private network connection, or some combination thereof. For example, a user may couple via an Internet connection with computing system 110 by accessing a web page or application presented by computing system 110 at a virtual or physical entity.

As will be described in further detail herein, the virtual machines are hosted by a host computing system. A host includes virtualization software that is installed on top of the hardware platform and supports a virtual machine execution space within which one or more virtual machines may be concurrently instantiated and executed.

In some embodiments, the virtualization software may be a hypervisor (e.g., a VMware ESX™ hypervisor, a VMware ESXi™ hypervisor, etc.) For example, if hypervisor is a VMware ESX™ hypervisor, then virtual functionality of the host is considered a VMware ESX™ server.

Additionally, a hypervisor or virtual machine monitor (VMM) is a piece of computer software, firmware or hardware that creates and runs virtual machines. A computer on which a hypervisor is running one or more virtual machines is defined as a host machine. Each virtual machine is called a guest machine. The hypervisor presents the guest operating systems with a virtual operating platform and manages the execution of the guest operating systems. Additional details regarding embodiments of structure and functionality of a host computer system are provided with respect to FIG. 2.

During use, the virtual machines perform various workloads. For example, the virtual machines perform the workloads based on executing various applications. The virtual machines can perform various workloads separately and/or in combination with one another.

Example Host Computer System

Figure 2:
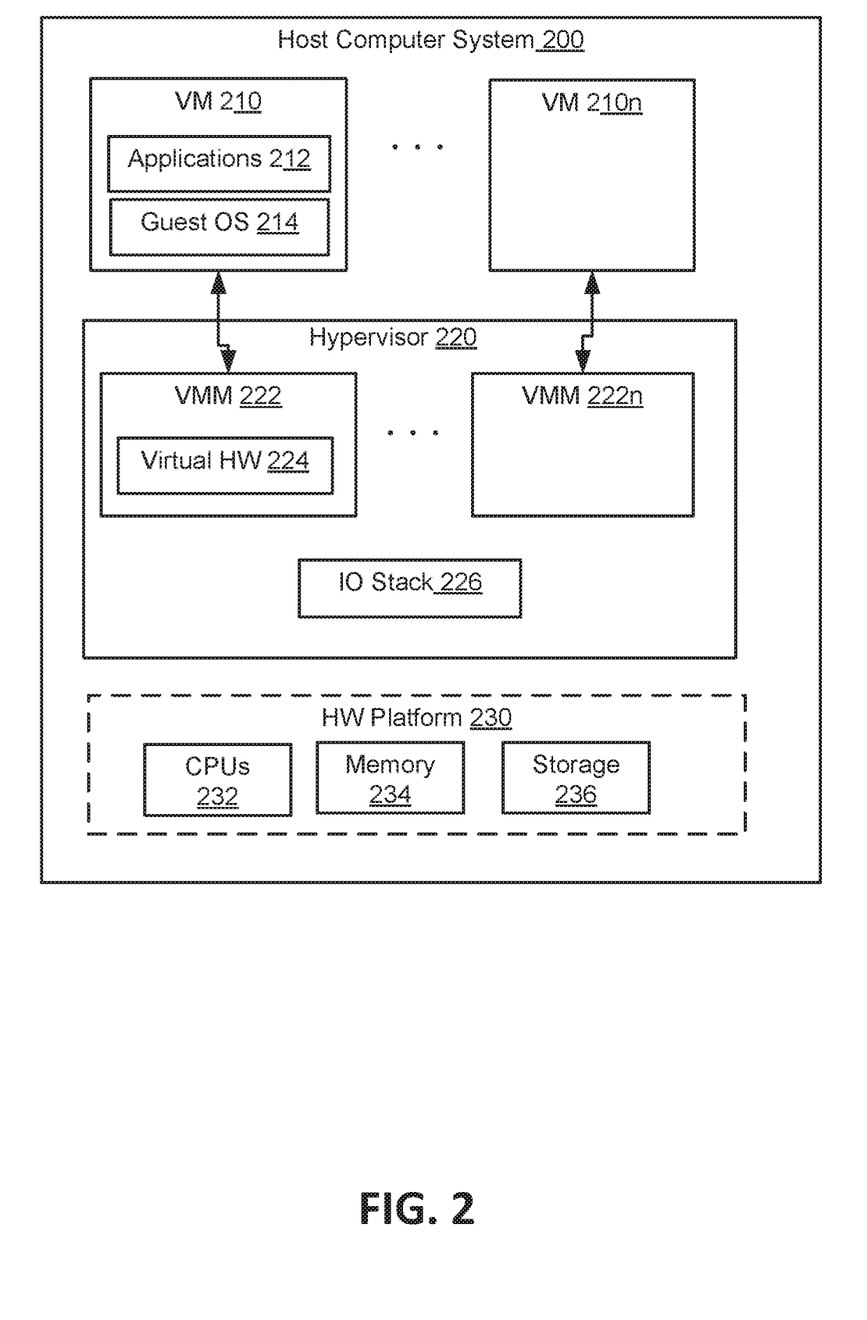
FIG. 2 depicts a block diagram of a host computing system, according to various embodiments.

FIG. 2 is a schematic diagram that illustrates a virtualized computer system that is configured to carry out one or more embodiments of the present invention. The virtualized computer system is implemented in a host computer system 200 including hardware platform 230. In one embodiment, host computer system 200 is constructed on a conventional, typically server-class, hardware platform.

Hardware platform 230 includes one or more central processing units (CPUs) 232, system memory 234, and storage 236. Hardware platform 230 may also include one or more network interface controllers (NICs) that connect host computer system 200 to a network, and one or more host bus adapters (HBAs) that connect host computer system 200 to a persistent storage unit.

Hypervisor 220 is installed on top of hardware platform 230 and supports a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware 224 for virtual machine 210 supports the installation of guest OS 214 which is capable of executing applications 212 within virtual machine 210.

Guest OS 214 may be any of the well-known commodity operating systems, and includes a native file system layer, for example, either an NTFS or an ext3FS type file system layer. Example operating systems include, without limitation, Windows operating systems (e.g., Windows 7, Windows 8, Windows 10, or Windows Server 2012 R2), UNIX operating systems (e.g., Mac OS X server), and Linux operating systems. Moreover, it should be appreciated that operating systems are updated over time to different versions of the operating system (e.g., to provide improved functionality and/or to address security concerns). In accordance with various embodiments, operating system versions can refer to a particular release of an operating system and/or a particular build of an operating system. For example, a security patch applied to an operating system may refer to a new version of the operating system.

IOs issued by guest OS 214 through the native file system layer appear to guest OS 214 as being routed to one or more virtual disks provisioned for virtual machine 210 for final execution, but such IOs are, in reality, reprocessed by IO stack 226 of hypervisor 220 and the reprocessed IOs are issued, for example, through an HBA to a storage system.

Virtual machine monitor (VMM) 222 and 222n may be considered separate virtualization components between the virtual machines and hypervisor 220 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

Examples of an Appliance

Figure 3:
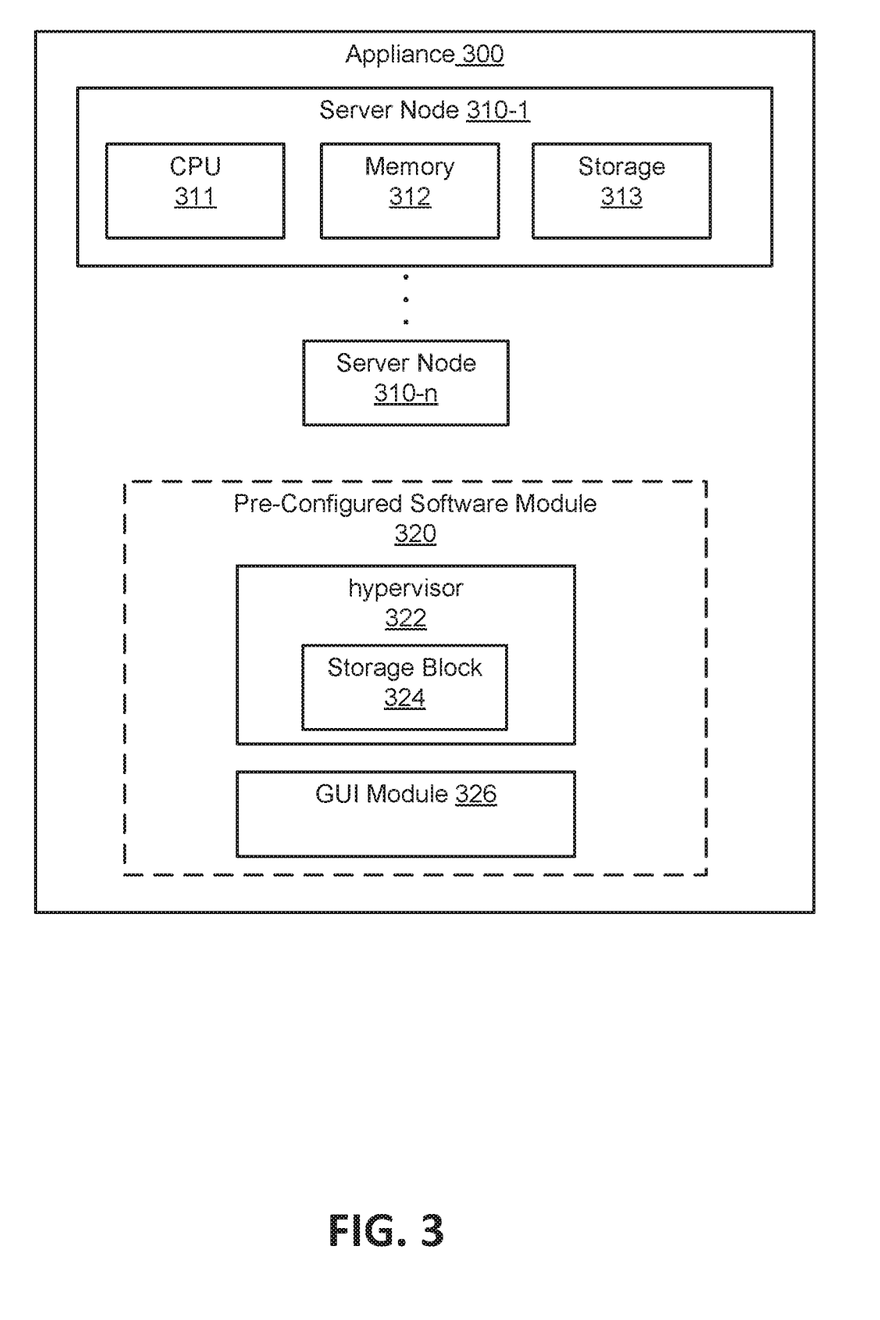
FIG. 3 depicts a block diagram of an appliance, according to various embodiments.

FIG. 3 depicts an embodiment of appliance 300. Appliance 300 is a computing device that includes the requisite physical hardware and software to create and manage a virtualization infrastructure. Appliance 300 is also referred to herein as a pre-configured hyper-converged computing device. In general, a hyper-converged computing device includes pretested, pre-configured and pre-integrated storage, server and network components, including software, that are located in an enclosure. Moreover, the hyper-converged computing device includes a hypervisor that supports a virtualization infrastructure.

Based on the pre-configured hardware and software disposed within appliance 300, appliance 300 enables a user to simply and quickly create a virtualization infrastructure and deploy virtual machines shortly after the appliance is powered on for the first time.

Appliance 300 includes, among other things, at least one server node. For example, server nodes 310-1 through server node 310-*n*. Server node 310-1 includes a central processing unit (CPU) 311, memory 312, and storage 313. It should be appreciated that other server nodes (i.e., server node 310-*n*) each include a CPU, memory, and storage similar to server node 310-*n*.

Appliance 300 is scalable. That is appliance can be scaled to include more than one server node. For example, appliance 300 can initially have a single server node. However, additional server nodes may be included in appliance 300.

In one embodiment, appliance 300 is able to deploy a plurality of virtual machines in the virtualization infrastructure. For example, based on the hardware and software incorporated in appliance 300, appliance 300 is able to deploy pre-set number of virtual machines (e.g., 75 virtual machines, 150 virtual machines, etc.).

Moreover, each server node may be considered a server or host computing system. That is, each server node is able to independently host a number of virtual machines. For example, server node 310-1 is able to host a first set of virtual machines, while other server nodes are each able to independently host other sets of virtual machines, respectively.

The server nodes are independent of one another, and are not required to share any functionality with one another. Appliance 300 does not include a backplane. As such, the server nodes are isolated from one another and therefore independent of one another.

CPU 311 may be, but is not limited to, a dual socket CPU (e.g., Intel Xeon™ CPUs, 4-core to 6-core).

Memory 312 may be, but is not limited to, 128 gigabytes (GB).

Storage may be, but is not limited to, three drive slots per node. Such as a solid state drive (SSD) (e.g., an SSD up to 800 GB), and two hard disk drives (HDD) (e.g., HDDs up to 8 terabytes (TB)).

Additionally, the appliance may include various external interfaces, such as but not limited to, serial, network RJ-45 (10000 NIC), graphics, management RJ-45 (100/10000 NIC), power (in front and in rear), UID (in front and in rear) and a USB.

The appliance may also include Component Interconnect Express (PCIe) expansion slots, and a disk controller with pass through capabilities. It should be appreciated that the appliance may include other hardware attributes that are compatible with supporting a virtualization infrastructure.

In one embodiment, appliance 300 is a rackable 2U/4Node appliance. That is, appliance 300 is two rack units in height and includes four server nodes (e.g., server nodes 310-1 through 310-*n*).

The size of a piece of rack-mounted equipment is described as a number in "U" or "RU" (rack unit). One rack unit is often referred to as "1 U", 2 rack units as "2 U" and so on. "U" is a unit of measure that describes the height of equipment designed to mount in a rack (e.g., 19-inch rack or a 23-inch rack). The 19-inch (482.6 mm) or 23-inch (584.2 mm) dimension refers to the width of the equipment mounting frame in the rack including the frame. In some instances, one rack unit is 1.75 inches (4.445 cm) high.

In another embodiment, appliance 300 is a 4 U/4 Node appliance. That is, appliance 300 is four rack units in height and includes 4 server nodes (e.g., server nodes 310-1 through 310-*n*).

Appliance 300 includes software to support a virtualization infrastructure. That is, appliance 300 includes code or instructions stored on physical hardware in appliance 300, that when executed by a processor, supports a virtualization infrastructure. For instance, appliance 300 includes pre-configured software module 320.

It should be appreciated that the software installed on appliance 300 (e.g., software module 320) is stored in a storage device. In various embodiments, the software may be installed in a single server node or may be distributed in various server nodes. In another embodiment, the software may be stored in a storage device within appliance 300 but is outside of the server nodes.

During operation of the appliance, the software may be executed by one or more CPUs in a single server node or the execution may be distributed amongst various CPUs in various server nodes.

Software module 320 includes, among other things, hypervisor 322. As described above, a hypervisor is installed on top of hardware platform (e.g., CPU, memory and storage) and supports a virtual machine execution space within which one or more virtual machines (VMs) may be concurrently instantiated and executed.

In various embodiments, hypervisor 322 is VMware ESX™ hypervisor or a VMware ESXi™ hypervisor. It is noted that "ESX" is derived from the term "Elastic Sky X" coined by VMware™.

It should be appreciated that software module 320, in one embodiment, includes a suite of software tools for cloud computing (e.g., VMware vSphere™, VCenter™) that utilizes various components such as a VMware ESX/ESXi hypervisor.

Software module 320 includes storage block 324. Storage block 324 is a logical partition of storage (e.g., storage 313) in appliance 300. In other words, storage block 324 is virtual storage. In one embodiment, storage block 324 is a virtual storage area network (VSAN). As a result, the VSAN allows traffic to be isolated within specific portions of a storage area network.

Storage block 324 is imbedded or integral with hypervisor 322. In other words, the data path for storage is in the hypervisor layer.

Various advantages occur due to the storage block integrated with the hypervisor. In one example, the VSAN communicates with the ESX layer at a kernel level and is not required to communicate over a network via an Ethernet connection. As such, communication latency between the storage block and hypervisor is reduced.

GUI module 326 is code or instructions that enable the utilization of a graphical user interface to creating and managing appliances (e.g., ESX hosts) and virtual machines of the virtualization infrastructure. The graphical user interface is described in further detail below.

It is noted that software module 320 is proprietary software of a single entity (e.g., VMware™). For example, hypervisor 322, storage block 324, and GUI module 326 are proprietary software code to a single entity. That is, hypervisor 322, storage block 324, and GUI module 326 are not open source code, and therefore require a license agreement between the licensor (e.g., VMware™) and a purchaser of the appliance that includes the proprietary software module. In one embodiment, the license agreement is an end-user license agreement (EULA). The EULA establishes the purchaser's right to use the software (e.g., software module 320) and the hardware of appliance 300.

Figure 4:
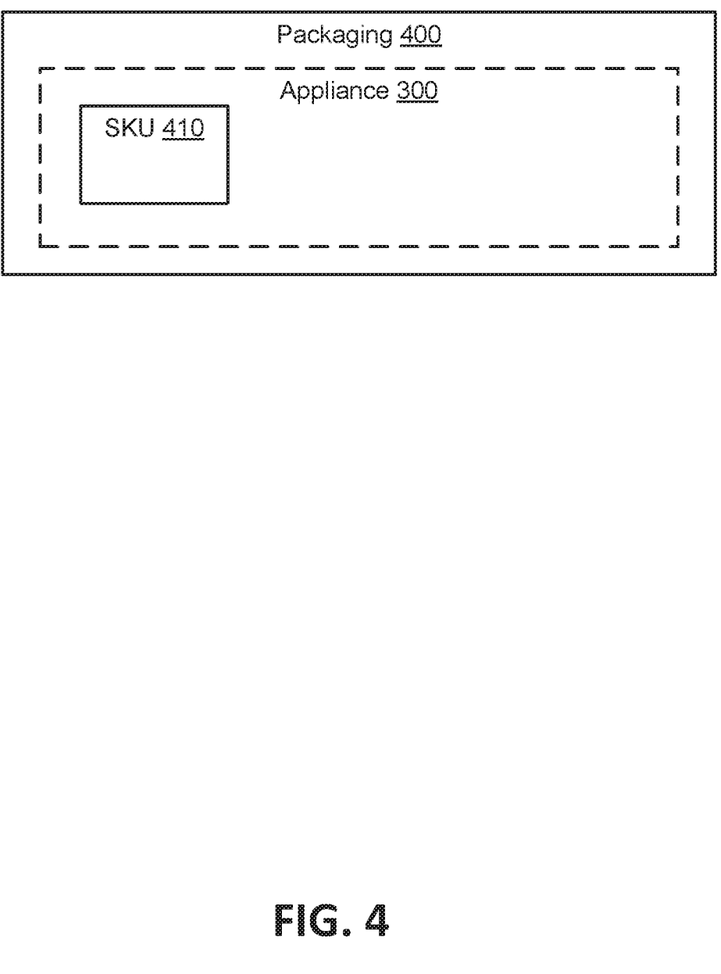
FIG. 4 depicts a block diagram of a side-view of an appliance offered for sale, according to various embodiments.

FIG. 4 depicts an embodiment of a side-view of an appliance offered for sale. In one embodiment, appliance 300 is offered for sale as a single stock keeping unit (SKU). For example, appliance 300 is disposed in packaging 400 and SKU 410 is on packaging 400. Accordingly, appliance 300 is offered for sale as a single SKU.

More specifically, appliance 300, as described herein, is pre-configured with the requisite hardware and software for employing a virtualization infrastructure. Therefore, subsequent the purchase of appliance 300 as a single SKU, appliance 300 is not required to include any additional hardware and/or software to support and manage a virtualization infrastructure.

Upon powering on appliance 300 for the first time, a single EULA is displayed to an end-user. Because software module 320 is proprietary to a single entity (e.g., VMware™), only a single EULA, provided by the single entity, is displayed to the purchasing end-user. More specifically, at least hypervisor 322 (e.g., ESX/ESXi hypervisor) and storage block 324 (e.g., VSAN) are proprietary to a single entity (e.g., VMware™). Therefore, only a single EULA pertaining to hypervisor 322 and storage block 324 is displayed and provided to an end-user.

Upon acceptance of the EULA, appliance 300 is enabled to operate and manage a virtualization infrastructure, and deploy virtual machines in the virtualization infrastructure.

It should be appreciated that upon first powering on appliance 300 and accepting the single EULA, a virtualization infrastructure is able to be rapidly created and a virtual machine is able to be deployed within the virtualization infrastructure within minutes (e.g., 15 minutes). Moreover, the virtualization infrastructure is able to be managed and controlled by an end-user that is not required to have high-level IT administrative training and experience.

In one embodiment, appliance 300 is able to deploy a plurality of virtual machines in the virtualization infrastructure. For example, based on the hardware and software incorporated in appliance 300, appliance 300 is able to deploy pre-set number of virtual machines (e.g., 75 virtual machines, 150 virtual machines, etc.).

Examples of Virtualization Infrastructures

Figure 5:
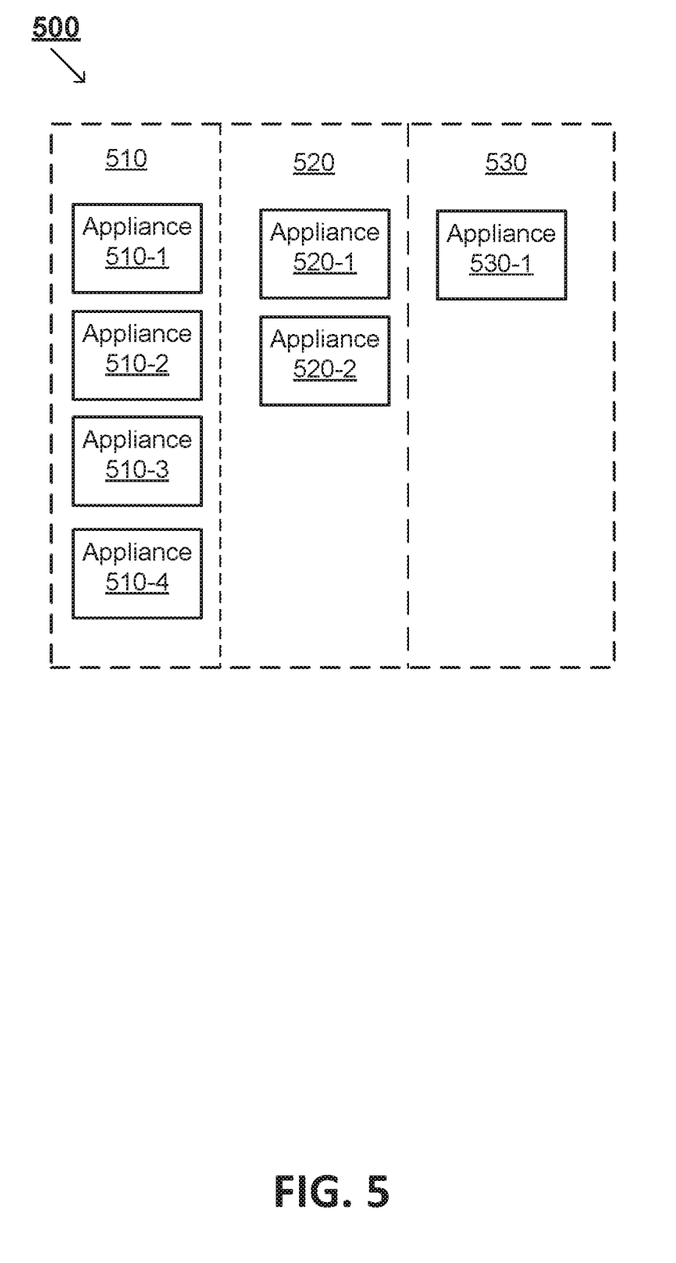
FIG. 5 depicts a block diagram of a virtualization infrastructure, according to various embodiments.

FIG. 5 depicts an embodiment of various appliances supporting virtualization infrastructure 500.

In one embodiment, appliances may be grouped together to increase the functionality of creating and managing a virtualization infrastructure. For example, appliance 510-1 was initially utilized to deploy a plurality of virtual machines, at location 510. However, additional virtual machines were desired but appliance 510-1, alone, was not able to meet the demand for the desired additional virtual machines. As such, additional appliances 510-2, 510-3, and 510-4 were purchased and grouped together to meet the demand of the additional virtual machines. In particular, the cluster of appliances which are communicatively coupled together, act as a single platform for managing the virtualization infrastructure and deploying virtual machines.

Similarly, appliance 520-1 was initially utilized to deploy a plurality of virtual machines, at location 520. However, additional virtual machines were desired but appliance 520-1, alone, was not able to meet the demand for the desired additional virtual machines. As such, additional appliance 520-2 was purchased and grouped together with appliance 520-1 to meet the demand of the additional virtual machines.

It should be appreciated that any number of appliances may be grouped together. For example, two, three, four, five or more appliances may be grouped together provided that the functionality of the appliances, as a whole, are able to act as a single platform for managing the virtualization infrastructure.

Additionally, the appliances and/or clusters of appliances may be located at various locations. For example, a first cluster of appliances may be located at a main office of an enterprise, while a second cluster of appliances are located at a remote office/branch office (ROBO).

In another example, virtualization infrastructure 500 is a virtualization infrastructure of a large enterprise having various building and infrastructure at various geo-locations. In such an example, information technology (IT) is located at a first location (e.g., location 510), an engineering team is located at a second location (e.g., location 520) and sales team is located at location 530.

Accordingly, appliances 510-1 through 510-4 may be grouped together at a first location 510 to support the demand for virtual machines of the IT team, appliances 510-1 and 510-2 are grouped together at location 520 to support the demand of virtual machines for the engineering team, and appliance 530-1 is located at location 530 to support the demand of virtual machines for the sales team.

As will be described in further detail below, GUI module 326 enables a GUI to facilitate the creating and managing of hosts and virtual machines. Moreover, the GUI is able to facilitate in managing the virtualization infrastructure by displaying the attributes of the appliances. For example, the GUI would display the particular health, resources used, and the like, for each of the appliances in virtualization infrastructure 500.

Example Virtual Environment

Figure 6:
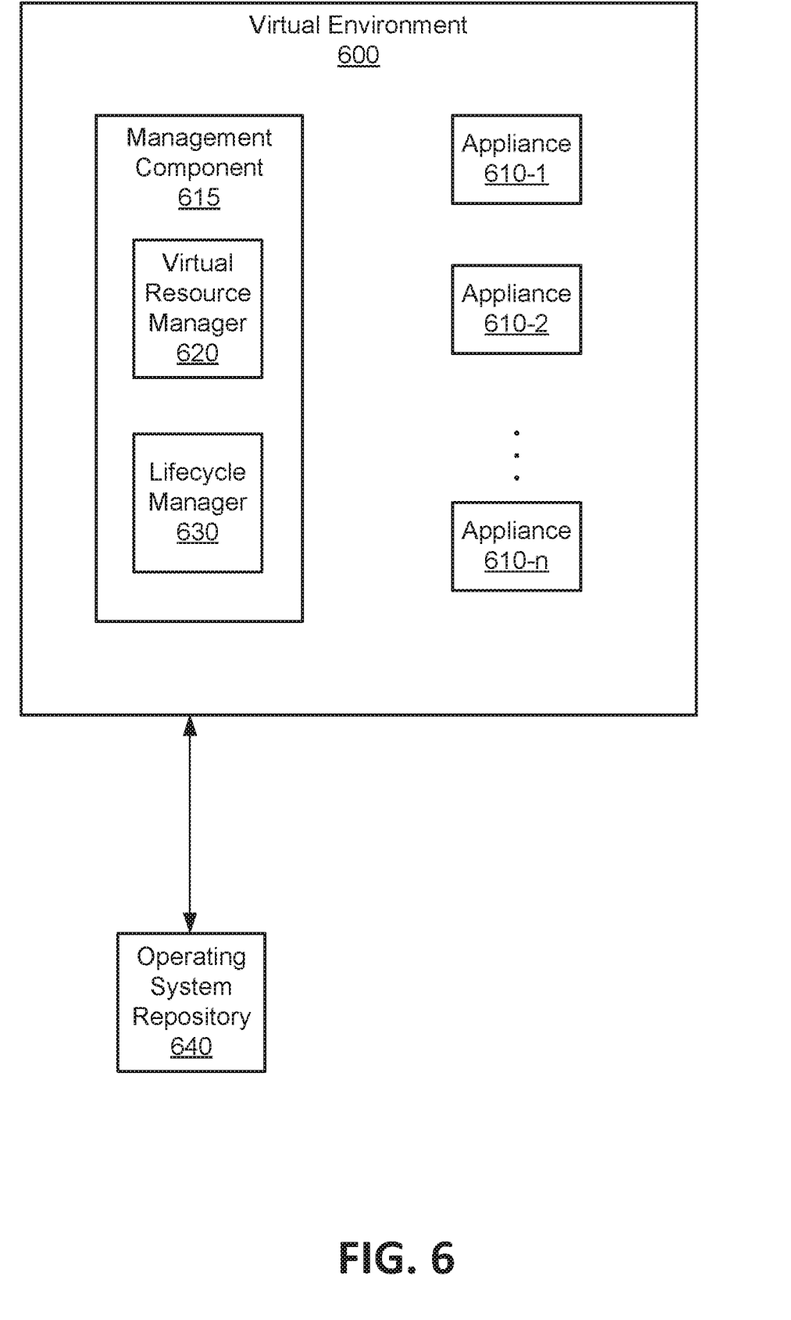
FIG. 6 illustrates an example virtual environment, in accordance with an embodiment.

FIG. 6 illustrates an example virtual environment 600 (e.g., a cloud environment) in accordance with an embodiment. Virtual environment 600 may include one or more appliances. Virtual environment 600, in one embodiment, includes appliance cluster 610 that includes appliances 610-1 through 610-n (e.g., a plurality of appliance 300 of FIG. 3). Appliances 610-1 through 610-n are communicatively coupled and act as a platform for managing the virtualization infrastructure and deploying virtual machines. VMware Cloud Foundation (VCF) is an example virtual environment 600.

Virtual environment 600 also includes management component 615 that includes virtual resource manager 620 and lifecycle manager 630. It should be appreciated that management component 615 may be implemented in a computing device, either virtual or physical, within virtual environment 600, and is communicatively coupled to appliances 610-1 through 610-n. Management component 615 may be implemented within one or more of appliances 610-1 through 610-n.

In various embodiments, virtual resource manager 620 is for managing allocation of hosts of appliances 610-1 through 610-n. For example, virtual resource manager 620 operates to make resources of appliances 610-1 through 610-n (e.g., storage hardware, computing hardware, and networking hardware) work together to achieve installation/operation and optimizing the resources for improved performance within virtual environment 600. Virtual resource manager 620 translates application requirements to physical infrastructure requirements. In accordance with various described embodiments, workload domains are mapped to a management cluster deployment (e.g., a vSphere cluster of VMware, Inc.) in a deployment (e.g., a rack deployment). Moreover, as additional appliances are added to virtual environment 600, cross-rack clusters become an option. Examples disclosed herein facilitate improved workload domain configuration and management.

As utilized herein, a workload domain is an abstraction that can be applied to a number of different types of compute workloads. This allows the administrator to deploy capacity for specific workload types using a policy-driven approach on top of physical resources. In various embodiments, a workload domain has a set of policies that are configurable by the user during the deployment process. For example, a workload domain can be configured according to capacity required (e.g., host count and storage requirements), availability required, performance required, and networks required.

In some embodiments, a workload domain is a grouping of hosts of appliances 610-1 through 610-n. It should be appreciated that a workload domain can include any number of hosts, and that hosts of a workload domain con be distributed across any number of appliances. In accordance with various embodiments, hosts of a workload domain have the same operating system version.

In various embodiments, management component 615 is a group of physical machines and/or virtual machines (VM) that host core cloud infrastructure components necessary for managing a software defined data center (SDDC) in a cloud computing environment that supports customer services. Cloud computing allows ubiquitous, convenient, on-demand network access to a shared pool of configurable computing resources. A cloud computing customer can request allocations of such resources to support services required by those customers. For example, when a customer requests to run one or more services in the cloud computing environment, one or more workload domains may be created based on resources in the shared pool of configurable computing resources. Examples disclosed herein enable customers to define different domain types, security, capacity, availability, and performance requirements for establishing workload domains in server rack deployments without requiring the users to have in-depth knowledge of server rack hardware and configurations.

Virtual resource manager 620 enables the ability for streamlined and automated data center operations and the delivery of service offerings, such as virtual infrastructure (VI) and virtual desktop infrastructure (VDI) environments, based on a SDDC or cloud-based architecture. In some embodiments, an instance of virtual resource manager 620 is deployed on each appliance 610-1 through 610-n as part of a managed cluster of services.

Virtual resource manager 620 manages the physical hardware resources (e.g., hosts) of appliances 610-1 through 610-n. For example, virtual resource manager can create a workload domain out of the underlying physical hardware resources of appliances 610-1 through 610-n. It should be appreciated that underlying physical hardware resources of a workload domain may span one or more physical racks (or smaller units such as a hyper-appliance or half rack) such that virtual resource manager 620 handles physical management of those resources.

Virtual resource manager 620 tracks available capacity in appliances 610-1 through 610-n, maintains a view of a logical pool of virtual resources, and translates logical resource provisioning to allocation of physical hardware resources. Virtual resource manager 620 interfaces with components of the virtual environment 600 to manage and present a logical view of underlying resources such as hosts and clusters. Virtual resource manager 620 also uses the logical view for orchestration and provisioning of workloads.

Lifecycle manager 630 enables automated updating of components of virtual environment 600. In some embodiments, lifecycle manager 630 is communicatively coupled to a software repository for accessing software updates. For example, lifecycle manager 630 receives notification of update availability for a component of virtual environment 600, downloads the update bundle, selects update targets, schedules the update, and applies the update to the target according to the schedule.

In some embodiments, virtual environment is communicatively coupled to an operating system repository 640. Operating system repository 640 is a repository of available operating system versions. It should be appreciated that operating system repository 640 can be remote to virtual environment 600, local to virtual environment 600, or a combination thereof. For example, management component 615 can retrieve an operating system version from operating system repository 640 for applying to a host.

Example Automated Application Updating within a Virtual Environment

In accordance with various embodiments, with reference to FIG. 6, as part of managing the components (e.g., software) of the virtual environment 600, virtual resource management component 615 provides for updating of software application executing within appliances 610-1 through 610-n (e.g., application running on a virtual machine executing within an appliance 610-1 through 610-n. In one embodiment, lifecycle manager 630 also is configured for updating software applications executing on appliances 610-1 through 610-n. For example, virtual resource management component 615 may include a combination of software application running on at least one virtual machine that itself is operating on top of the virtual environment 600 that virtual resource management component 615 is managing.

In some embodiments, the virtual resource management component 615 applications run on a Unix based operating system on a user account. These accounts are managed by the software applications running on them, and there is typically no human user managing these user accounts. Moreover, due to potential security vulnerabilities, the software applications do not run as "root" applications, and as per the security requirements, the applications do not store the "user" or "root" credentials.

As part of managing the lifecycle of the virtual infrastructure, the virtual resource management component 615 is also responsible for managing the lifecycle of its own components (e.g., performing self-updates). These components/applications may require the third party software and operating system updates. Examples of such third party components include Java, OpenSSL, Python, Perl etc., including the operating system patch and security updates. Moreover, the initialization scripts (e.g., init scripts) for the application initialization and the watchdog scripts for the virtual resource management component 615 applications may require root privilege for modifications. Since the virtual resource management component 615 applications run on an automated user account (e.g., where there is no human interaction for managing and updating these application), embodiments described herein provide for executing application updates for the virtual resource management component 615 that require "root" privileges.

Embodiments described herein provide methods and systems for automating application updates in a virtual computing environment. A user account is provisioned during installation of the operating system of the virtual computing environment 600, where virtual resource management component 615 runs on the operating system. In some embodiments, the operating system is a Unix or Unix-like operating system, such as UNIX/Linux. However, it should be appreciated that any type of operating system capable of providing root access to a user may be used in accordance with the described embodiments.

In one embodiment, in a Unix-like operating system, an unprivileged user (e.g., an automated user) is allowed to run certain commands without requiring a password through a superuser control file. For example, in the UNIX/Linux operating system, an unprivileged user is allowed to run certain commands without requiring a password through a /etc/sudoers file. An example user "veadmin" can run a reboot/stop system command (e.g., /sbin/halt) without any password by adding the following entry to the /etc/sudoers file:

veadm in ALL=NOPASSWD: /sbin/halt This entry allows the /sbin/halt command to be executed as root without requiring authentication of the user "veadmin".

In one embodiment, the user account "veadmin" gets provisioned and the /etc/sudoers file is edited at the time of installation. It should be appreciated that the command which the user "veadmin" is established at provisioning. If it is determined that the user "veadmin" needs to perform more operations which require elevated "root" privilege, in accordance with embodiments, manual intervention may be required to update the commands available to the user "veadmin".

Embodiments described herein allows an unprivileged user (e.g. "veadmin") to gain full control of the system as "root" if needed without requiring to modify the superuser control file (e.g., /etc/sudoers file). The commands which the user is going to execute do not need to be known ahead of time.

In one embodiment, a control script that can execute a second script as a command line parameter is specified, wherein the control script is for execution by a user account without requiring a password. For example, the following script is specified:

command_runner.sh
!/bin/bash
Run any script with root access
"$@"

The script "command_runner.sh" is placed in a root folder during the time of appliance creation and add the command "command_runner.sh" is added to the to the /etc/sudoers file.

veadm in ALL=NOPASSWD: /sbin/command_runner.sh

In order to ensure that the control script is not exploited (e.g., if the user account "veadmin" is hacked or compromised), only designated scripts can be executed by the "veadmin" user account. To ensure that supplied scripts are appropriate and not exploitations, embodiments utilize public key encryption to validate a source of the supplied scripts. For example, the supplied script which the command_runner.sh is going to execute is signed by a signature authority and the command_runner.sh validates the authenticity of the supplied script prior to execution of the supplied script.

A public key of the signature authority into a known folder of virtual environment 600. A script and a digital signature for the script are received. In one embodiment the script is an update script including an application update for updating an application installed on virtual environment 600. For example, "command-runner.sh" receives two arguments: the script and the digital signature of the script passed in the first argument.

The digital signature of the supplied script is validated using a public key of the virtual environment. The script with root access (e.g., "command-runner.sh") will only execute the script if the supplied script passes the authenticity check. For example, "command_runner.sh" validates the digital signature of the given script using the public key in the known location. In one embodiment, the public key of the signature authority is pre-fabricated in the appliance (e.g., the appliance gets shipped in the product with the public key installed in a given root folder). Upon validation of the digital signature, the supplied script is executed by the control script.

In some embodiments, update scripts can be signed by the signature authority at the time of patch creation before the patch gets published to the customer. For example, this is useful for day-two third party/operating system patching/update operations.

Figure 7:
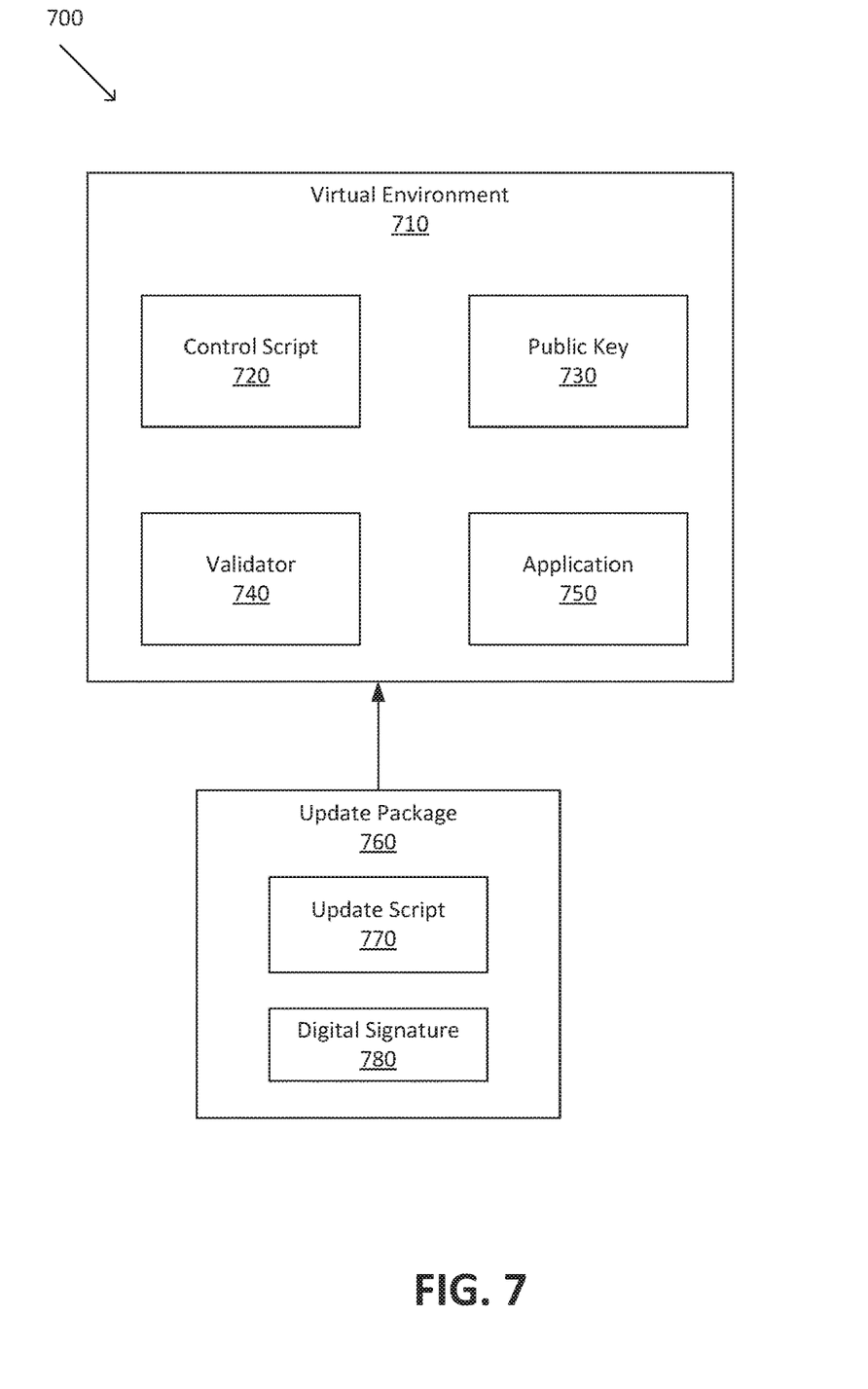
FIG. 7 is a block diagram of system for automating application updates in a virtual environment, in accordance with various embodiments.

FIG. 7 is a block diagram of system 700 for automating application updates in a virtual environment 710, in accordance with various embodiments. In accordance with various embodiments, system 700 includes control script 720, public key 730, validator 740, and application 750. It should be appreciated that control script 720, public key 730, validator 740, and application 750 can reside within a single appliance (e.g., a pre-configured hyper-converged computing device), or can be distributed across multiple appliances (e.g., appliances 610-1 through 610-$n$ of FIG. 6). Moreover, control script 720 and/or validator 740 may be comprised within a lifecycle manager (e.g., lifecycle manager 630). Application 750 is executing within virtual environment 710 (e.g., application 750 runs on a virtual machine executing within an appliance 610-1 through 610-$n$).

Control script 720 is a script capable of executing other scripts (e.g., update script 770) as a command line parameter and is for execution by user account without requiring a password. Public key 730 is installed in a known root folder of virtual environment 710. Validator 740 is configured to validate a digital signature 780 associated with update script 770 (which are collectively received in update package 760).

Virtual environment 710 is configured to receive update package 760 including with update script 770 and digital signature 780. Update script 770 includes an application update for updating application 750 installed on virtual environment 710. Upon validation of digital signature 780 by validator 740, update script 770 is executed by control script 720 to update application 750.

Example Methods of Operation

Figure 8:
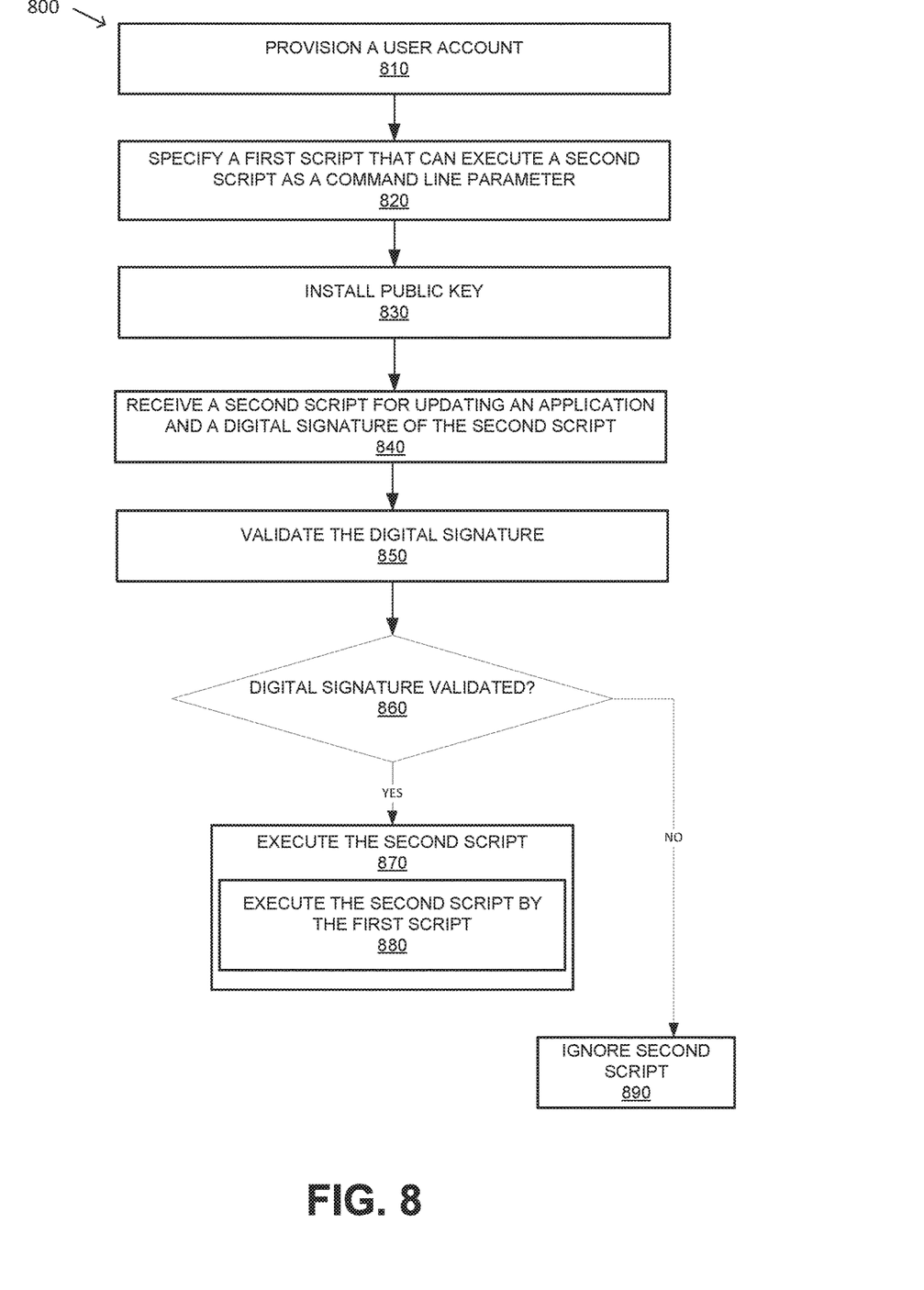
FIG. 8 depicts a flow diagram of a method for automating application updates in a virtual environment, according to various embodiments.

The following discussion sets forth in detail the operation of some example methods of operation of embodiments. With reference to FIG. 8, flow diagram 800 illustrates example procedures used by various embodiments. Flow diagram 800 includes some procedures that, in various embodiments, are carried out by a processor under the control of computer-readable and computer-executable instructions. In this fashion, procedures described herein and in conjunction with flow diagram 800 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 110 and/or virtualized environment 120). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagram 800 such procedures are examples. That is, embodiments are well suited to performing various other procedures or variations of the procedures recited in flow diagram 800. Likewise, in some embodiments, the procedures in flow diagram 800 may be performed in an order different than presented and/or not all of the procedures described in one or more of these flow diagrams may be performed. It is further appreciated that procedures described in flow diagram 800 may be implemented in hardware, or a combination of hardware with firmware and/or software provided by appliance 300.

FIG. 8 depicts a flow diagram 800 of a method for automating application updates in a virtual environment, according to various embodiments. At procedure 810 of flow diagram 800, a user account is provisioned. In one embodiment, the user account is provisioned during installation of the virtual environment. In one embodiment, the virtual environment includes a pre-configured hyper-converged computing device, where the user account is provisioned during installation of the pre-configured hyper-converged computing device. In one embodiment, the user account is an unprivileged user account. In one embodiment, the user account is an automated user account.

At procedure 820, a first script that can execute a second script as a command line parameter is specified. The first script is for execution by a user account without requiring a password. In one embodiment, the first script is for execution as a command line parameter. In one embodiment, the user account is provisioned during installation of the first script. At procedure 830, a public key of a signature authority is installed within a known root folder of the virtual computing environment. In one embodiment, a digital signature and the public key are provided by a signature authority, where the public key is used for validating the digital signature.

At procedure 840, a second script and a digital signature of the second script are received. The second script includes an application update for updating an application installed on the virtual computing environment. In one embodiment, the digital signature is generated prior to the second script being made accessible to the virtual computing environment At procedure 850, the digital signature of the second script is validated using the public key. At procedure 860, it is determined whether the digital signature is validated. If the digital signature is not validated, as shown at procedure 890, the second script is ignored. If the digital signature is validated, as shown at procedure 870, the second script is executed to update the application. In one embodiment, as shown at procedure 880, the second script is executed by the first script.

It is noted that any of the procedures, stated above, regarding flow diagram 800 may be implemented in hardware, or a combination of hardware with firmware and/or software. For example, any of the procedures are implemented by a processor(s) of a cloud environment and/or a computing environment.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed:

1. A method for automating application updates in a virtual computing environment, the method comprising:
    specifying a control script at the virtual computing environment, wherein the control script is placed in a root folder of the virtual computing environment and has root access within the virtual computing environment, and wherein the control script is for execution by an unprivileged user account without requiring a password;
    installing a public key within a known root folder of the virtual computing environment;
    receiving an update script and a digital signature for the update script, wherein the update script comprises an application update for updating an application installed on the virtual computing environment;

validating the digital signature of the update script using the public key of the virtual computing environment; and provided the digital signature of the update script is validated, executing the update script by the control script of the virtual computing environment to update the application.

2. The method of claim 1, wherein the control script is for execution as a command line parameter without requiring a password.

3. The method of claim 1, further comprising:
provisioning the unprivileged user account during installation of the control script.

4. The method of claim 3, wherein the unprivileged user account is an automated user account.

5. The method of claim 1, wherein the digital signature and the public key are provided by a signature authority.

6. The method of claim 1, wherein the digital signature is generated prior to the update script being made accessible to the virtual computing environment.

7. The method of claim 1, wherein the virtual computing environment comprises a pre-configured hyper-converged computing device.

8. A non-transitory computer readable storage medium having computer readable program code stored thereon for causing a computer system to perform a method for automating application updates in a virtual computing environment, the method comprising:

specifying a first script that can execute a second script as a command line parameter, wherein the first script is placed in a root folder of the virtual computing environment and has root access within the virtual computing environment, and wherein the first script is for execution by a user account without requiring a password;

installing a public key of a signature authority within a known root folder of the virtual computing environment;

receiving a second script and a digital signature of the second script, wherein the second script comprises an application update for updating an application installed on the virtual computing environment;

validating the digital signature of the second script using the public key; and provided the digital signature of the second script is validated, executing the second script by the first script to update the application.

9. The non-transitory computer readable storage medium of claim 8, wherein the first script is for execution as a command line parameter.

10. The non-transitory computer readable storage medium of claim 8, the method further comprising:
provisioning the user account during installation of the first script.

11. The non-transitory computer readable storage medium of claim 8, wherein the user account is an unprivileged user account.

12. The non-transitory computer readable storage medium of claim 8, wherein the user account is an automated user account.

13. The non-transitory computer readable storage medium of claim 8, wherein the digital signature and the public key are provided by a signature authority.

14. The non-transitory computer readable storage medium of claim 8, wherein the digital signature is generated prior to the second script being made accessible to the virtual computing environment.

15. The non-transitory computer readable storage medium of claim 14, wherein the virtual computing environment comprises a pre-configured hyper-converged computing device.

16. A computer system comprising:
a data storage unit; and
a processor coupled with the data storage unit, the processor configured to:
specify a first script that can execute a second script as a command line parameter, wherein the first script is placed in a root folder of the virtual computing environment and has root access within the virtual computing environment, and wherein the first script is for execution by a user account without requiring a password;

install a public key of a signature authority within a known root folder of the computer system;

receive a second script and a digital signature of the second script, wherein the second script comprises an application update for updating an application installed on the computer system;

validate the digital signature of the second script using the public key; and execute the second script by the first script to update the application provided the digital signature of the second script is validated.

* * * * *